United States Patent
Lee et al.

(10) Patent No.: US 10,818,957 B2
(45) Date of Patent: Oct. 27, 2020

(54) METHOD OF MANUFACTURING EMBEDDED TYPE BATTERY PACK USING HOT-MELT FIXING STRUCTURE AND BATTERY PACK MANUFACTURED USING THE SAME

(71) Applicant: LG CHEM, LTD., Seoul (KR)

(72) Inventors: Bum Jick Lee, Daejeon (KR); Soo Jun Ahn, Daejeon (KR); Dong Cheol Lee, Daejeon (KR); Yong Ho Cho, Daejeon (KR); Jae Hyeon Ju, Daejeon (KR)

(73) Assignee: LG CHEM, LTD., Seoul (KR)

( * ) Notice: Subject to any disclaimer, the term of this patent is extended or adjusted under 35 U.S.C. 154(b) by 186 days.

(21) Appl. No.: 15/518,028

(22) PCT Filed: Apr. 15, 2016

(86) PCT No.: PCT/KR2016/003944
§ 371 (c)(1),
(2) Date: Apr. 10, 2017

(87) PCT Pub. No.: WO2016/167599
PCT Pub. Date: Oct. 20, 2016

(65) Prior Publication Data
US 2018/0166736 A1  Jun. 14, 2018

(30) Foreign Application Priority Data
Apr. 15, 2015  (KR) .................. 10-2015-0053036

(51) Int. Cl.
*H01M 2/02* (2006.01)
*H01M 10/04* (2006.01)
(Continued)

(52) U.S. Cl.
CPC ......... *H01M 10/0436* (2013.01); *H01M 2/02* (2013.01); *H01M 2/0287* (2013.01);
(Continued)

(58) Field of Classification Search
CPC ......... H01M 10/0436; H01M 10/0525; H01M 10/4257; H01M 2/02; H01M 2/0287;
(Continued)

(56) References Cited

U.S. PATENT DOCUMENTS

2005/0181242 A1* 8/2005 Suzuki ............... H01M 2/0212
429/7
2005/0214597 A1  9/2005 Kim et al.
(Continued)

FOREIGN PATENT DOCUMENTS

CN  1655380 A  8/2005
JP  2003-77435 A  3/2003
(Continued)

OTHER PUBLICATIONS

International Search Report, issued in PCT/KR2016/003944, dated Jul. 26, 2016.
(Continued)

*Primary Examiner* — Stephen J Yanchuk
(74) *Attorney, Agent, or Firm* — Birch, Stewart, Kolasch & Birch, LLP (57) ABSTRACT

Disclosed herein is a method of manufacturing a battery pack including a battery cell having an electrode assembly received in a battery case, made of a laminate sheet including a resin layer and a metal layer, together with an electrolytic solution. An upper case, a PCB, and a battery cell are simultaneously coupled to each other through a hot-melt process without using additional members, such as double-sided adhesive tape and a PCM case. In particular, a label can be removed from an embedded type battery pack. Consequently, it is possible to improve manufacturing efficiency and reduce manufacturing cost due to the reduction in the number of parts.

13 Claims, 6 Drawing Sheets

(51) Int. Cl.
  *H01M 2/10* (2006.01)
  *H01M 2/26* (2006.01)
  *H01M 2/34* (2006.01)
  *H01M 10/0525* (2010.01)
  *H01M 10/42* (2006.01)

(52) U.S. Cl.
  CPC ........... *H01M 2/10* (2013.01); *H01M 2/1022* (2013.01); *H01M 2/1061* (2013.01); *H01M 2/26* (2013.01); *H01M 2/348* (2013.01); *H01M 10/04* (2013.01); *H01M 10/0525* (2013.01); *H01M 10/4257* (2013.01); *H01M 2200/106* (2013.01); *H01M 2220/30* (2013.01)

(58) Field of Classification Search
  CPC .... H01M 2/10; H01M 2/1022; H01M 2/1061; H01M 2/26; H01M 2/348; H01M 2200/106; H01M 2200/30; H01M 2220/30; H01M 10/04
  See application file for complete search history.

(56) References Cited

U.S. PATENT DOCUMENTS

| | | |
|---|---|---|
| 2006/0068281 A1 | 3/2006 | Hiratsuka et al. |
| 2009/0081537 A1* | 3/2009 | Kim .................... H01M 2/1022 429/176 |
| 2010/0258975 A1* | 10/2010 | Goda .................. B29C 45/2602 264/272.21 |
| 2014/0072832 A1 | 3/2014 | Lee et al. |

FOREIGN PATENT DOCUMENTS

| | | |
|---|---|---|
| JP | 2006-310298 A | 11/2006 |
| JP | 2009-181802 A | 8/2009 |
| JP | 2010-182598 A | 8/2010 |
| JP | 2011-507182 A | 3/2011 |
| JP | 2012-119290 A | 6/2012 |
| KR | 10-2005-0012752 A | 2/2005 |
| KR | 10-2005-0082424 A | 8/2005 |
| KR | 10-0859453 B1 | 9/2008 |
| KR | 10-0867927 B1 | 11/2008 |
| KR | 10-1420826 B1 | 7/2014 |
| KR | 10-2015-0037389 A | 4/2015 |

OTHER PUBLICATIONS

Extended European Search Report dated Jul. 4, 2017 in European Patent Application No. 16780322.0.

* cited by examiner

METHOD OF MANUFACTURING EMBEDDED TYPE BATTERY PACK USING HOT-MELT FIXING STRUCTURE AND BATTERY PACK MANUFACTURED USING THE SAME

CROSS-REFERENCE TO RELATED APPLICATIONS

This application claims the benefit of Korean Patent Application No. 10-2015-0053036 filed on Apr. 15, 2015 with the Korean Intellectual Property Office, the disclosure of which is herein incorporated by reference in its entirety.

TECHNICAL FIELD

The present invention relates to a method of manufacturing an embedded type battery pack using a hot-melt fixing structure and a battery pack manufactured using the same.

BACKGROUND ART

As mobile devices have been continuously developed and the demand for such mobile devices has increased, the demand for secondary batteries has also sharply increased. Among these secondary batteries, lithium secondary batteries, which exhibit high energy density and operating voltage and excellent charge retention and service-life characteristics, have been widely used as an energy source for various electronic products as well as various mobile devices.

Depending upon the kind of external device in which a secondary battery is used, the secondary battery may be configured to have a detachable type structure in which the secondary battery can be easily inserted into and removed from the external device or to have an embedded type structure in which the secondary battery is embedded in the external device. For example, the detachable type secondary battery can be inserted into or removed from devices, such as laptop computers, as needed. On the other hand, devices, such as some kinds of mobile phones, MPEG Audio Layer-3 (MP3) players, tablet PCs, and smart pads, require an embedded type battery pack due to the structure or capacity thereof.

Meanwhile, various kinds of combustible materials are contained in a lithium secondary battery. As a result, the lithium secondary battery may be heated or may explode in the event of the overcharge of the lithium secondary battery, overcurrent in the lithium secondary battery, or the application of some other external physical impact to the lithium secondary battery. That is, the safety of the lithium secondary battery is very low. For this reason, safety elements, such as a positive temperature coefficient (PTC) element and a protection circuit module (PCM), which are capable of effectively controlling the abnormal state of the lithium secondary battery, such as the overcharge of the lithium secondary battery or the overcurrent in the lithium secondary battery, are connected to a battery cell of the lithium secondary battery.

Preferably, such a secondary battery is manufactured so as to have as small a size and weight as possible. For this reason, a prismatic battery or a pouch-shaped battery, which has a small weight to capacity ratio, is usually used as a battery cell of the secondary battery. In particular, much interest is currently focused on a pouch-shaped battery that uses an aluminum laminate sheet as a sheathing member because such a pouch-shaped battery is lightweight and the cost of manufacturing the pouch-shaped battery is low.

In the case in which a battery pack is manufactured using a pouch-shaped battery cell, as described above, a PCM is connected and fixed to electrodes of the battery cell in the state in which the battery cell is mounted to a case, and a label is attached to the outer surface of the case, whereby the battery pack is manufactured. For example, the case may include an upper cover and a lower cover, which are coupled to each other in order to surround the outer surface of the battery cell. Alternatively, the case may be configured to have a frame structure for fixing the outer edge of the battery cell.

However, the necessity for a battery cell to have a compact structure and exhibit improved structural stability has increased. As a result, there has been used a method of surrounding the outer edge of the battery cell through a hot-melt process instead of the frame.

Figure 1:
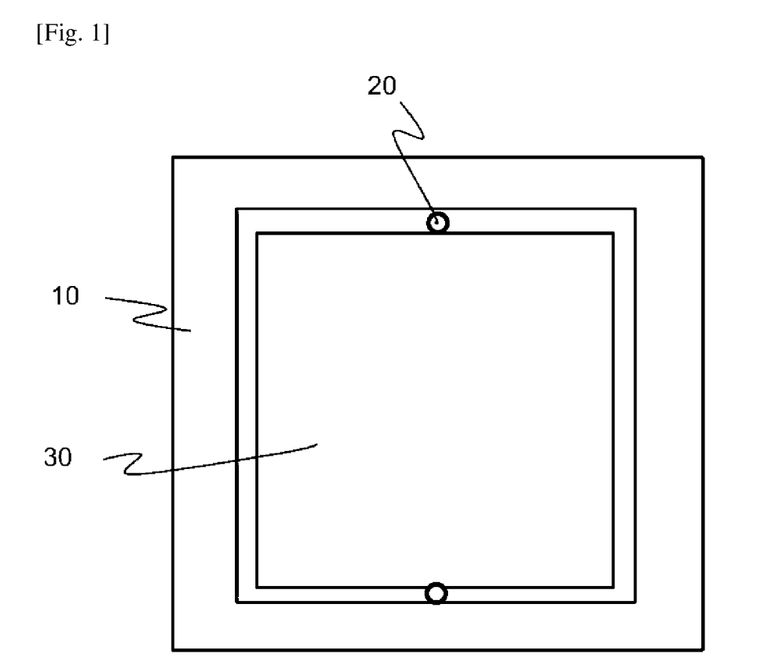
FIG. 1 is a sectional view schematically showing the structure of a mold used in a conventional hot-melt process.

Specifically, FIG. 1 is a sectional view schematically showing the structure of a mold used in a conventional hot-melt process.

Referring to FIG. 1, a battery cell 30 is placed in a mold 10, and a hot-melt resin is injected into the mold 10 through injection ports 20 formed in the upper and lower parts of the mold in order to wrap the outer edge of the battery cell with the resin.

Subsequently, the battery cell 30, the outer edge of which has been wrapped with the resin, is removed from the mold 10, and then, although not shown, a protection circuit board and a PCM received in a PCM case, to which the PCB is mounted, are loaded on the outer surface of a receiving part of the battery cell and a thermally welded surplus portion (i.e. a terrace) of the battery cell using a piece of double-sided adhesive tape, whereby a battery pack is assembled.

In the case in which the above method is used, however, the hot-melt resin injected through the injection ports is not distributed to portions of the mold that are distant from the injection ports, whereby the defect rate of molded products is increased. When high pressure is applied to the hot-melt resin in order to distribute the resin to the portions of the mold that are distant from the injection ports, a high-pressure impact is applied to the battery cell.

In addition, in the case in which the PCM is mounted using the double-sided adhesive tape, the PCM easily becomes unstable in response to external impact, and additional process cost is increased due to the use of various parts, such as double-sided adhesive tape, a lower case, and a PCM holder.

Therefore, there is a high necessity for battery pack manufacturing technology that is capable of reducing the defect rate in the process, improving the durability of battery packs, reducing the cost of manufacturing the battery packs, and maximizing the capacity of the battery packs.

DISCLOSURE

Technical Problem

Therefore, the present invention has been made to solve the above problems and other technical problems that have yet to be resolved.

Specifically, it is an object of the present invention to provided a battery pack configured such that a PCB is stably mounted to a battery cell, wherein injection molding is performed at a low pressure while improving the mobility of a hot-melt resin without using additional members by appropriately arranging injection ports in a mold when performing a hot-melt process and increasing the number of injection ports, whereby the defect rate in the hot-melt process is reduced.

Technical Solution

In accordance with one aspect of the present invention, the above and other objects can be accomplished by the provision of a method of manufacturing a battery pack including a battery cell having an electrode assembly received in a battery case, made of a laminate sheet including a resin layer and a metal layer, together with an electrolytic solution, the method including (a) electrically connecting electrode terminals of a battery cell to electrode terminal connection parts of a protection circuit board (PCB) having a connector, which is electrically connected to a device, and a protection circuit formed thereon, (b) coupling an upper case to the upper part of the PCB, (c) bending an upper sealed portion of the battery cell, at which the electrode terminals are located, and loading the PCB, to which the upper case has been coupled, on the upper end of the battery cell such that the PCB is parallel to the outer wall of an electrode assembly receiving part of the battery cell and such that the connector protrudes upward, (d) placing the upper case, the PCB, and the battery cell, which have been coupled to each other, in a mold, which is provided in regions thereof corresponding to a peripheral edge of the battery cell with two or more injection ports, through which a hot-melt resin is injected, (e) injecting a hot-melt resin through the injection ports to perform a hot-melt process, in which the hot-melt resin fills a space defined between the upper case, the PCB, and the battery cell and the mold, and (0 removing a resultant structure from the mold.

The upper sealed portion means a portion having surplus space formed at one of the sealed outer edges that are formed when the electrode assembly is mounted in the battery case in a sealed state. The upper sealed portion will be obvious to those skilled in the art to which the present invention pertains, and therefore a detailed description thereof will be omitted.

In addition, the outer edge means an edge that surrounds the outer circumference of the battery cell instead of a conventional frame, to which the battery cell is mounted.

In a concrete example, the mold may include a lower mold and an upper mold, which are coupled to each other such that the hot-melt process is performed, and a structure corresponding to external shapes of the upper case, the PCB, and the battery cell, which have been coupled to each other, may be carved in at least one selected from between the lower mold and the upper mold. Specifically, the structure corresponding to the external shapes of the upper case, the PCB, and the battery cell may be carved in the lower mold.

In addition, the positions at which the injection ports are formed are not particularly restricted. The injection ports may be formed in the upper mold and/or the lower mold. Specifically, the injection ports may be formed in the lower mold.

That is, in the method of manufacturing the battery pack according to the present invention, the upper case, the PCB, and the battery cell, which are coupled to each other, are placed between the lower mold and the upper mold, the lower mold and the upper mold are coupled to each other, and the hot-melt resin is injected into the mold through the injection ports formed in the mold to form the outer edge at the battery cell, whereby the battery pack is manufactured.

Meanwhile, in the method of manufacturing the battery pack through the conventional hot-melt process, as described above, the number of injection ports formed in the mold is not large, with the result that it is difficult to uniformly distribute the hot-melt resin in the mold. In addition, the hot-melt resin is injected at a high pressure, with the result that impact is applied to the battery cell when the outer edge is formed at the battery cell through high-pressure molding.

As a result of a variety of extensive and intensive studies and experiments, the inventors of the present application have found that the above problem is solved in the case in which the minimum number of injection ports is eight. Specifically, therefore, the mold may have eight or more injection ports.

Specifically, two or more injection ports may be formed in the upper part of the mold, at which the electrode terminals are located, such that a peripheral edge of the upper part of the battery cell, at which the PCB is located, is thickly formed in order to stably fix and mount the PCB to the battery cell without using a conventional PCM case. Alternatively, two or more injection ports may be formed in the lower part of the mold such that a peripheral edge for fixing the battery cell is formed at the lower end of the battery cell while the lower end of the battery cell is sealed without using a lower case. In yet another alternative, one injection port may be formed in the middle of each side part of the mold such that a peripheral edge, which is necessary to protect the battery cell from external impact, is formed at the side surface of the battery cell without using conventional side frames, which are provided at the battery cell. Specifically, the injection ports may be formed in two or more of the regions of the mold. In addition, the injection ports may be formed in all regions of the mold such that all of the effects can be exhibited.

Furthermore, at least one of the injection ports may be formed in peripheral corners of the mold such that, when the hot-melt resin flows in the mold, the resin does not pass through the bent parts of the mold, which may disturb the flow of the resin. Specifically, the injection ports may be formed in all peripheral corners of the mold. "Peripheral corners" means portions at which two adjacent peripheral sides of the mold intersect.

The distance between the injection ports may range from 10 mm to 15 mm. In the case in which the distance between the injection ports is less than 10 mm, the number of injection ports formed in the mold is excessively increased, whereby the manufacturing process is complicated and the manufacturing cost is increased. On the other hand, in the case in which the distance between the injection ports is greater than 15 mm, the movement distance of the hot-melt resin is increased, whereby it is difficult to achieve the desired effects of the present invention.

As a result, in the method of manufacturing the battery pack according to the present invention, the distance between the injection ports is decreased, the injection ports are effectively arranged in the mold, whereby the mobility of the hot-melt resin is improved and the peripheral edge is formed at a low temperature, compared to the conventional art.

Meanwhile, in the method of manufacturing the battery pack according to the present invention, step (e) may include fixing the PCB to the upper part of the battery cell through the hot-melt process, in addition to forming the peripheral edge at the battery cell.

In the method of manufacturing the battery pack according to the present invention, therefore, the upper case, the PCB, and the battery cell are coupled to each other only through the hot-melt process performed using the mold, as described above, whereby various members, such as a PCM case necessary to load the PCB on the battery cell, a frame necessary to mount the battery cell, and a lower case for sealing the lower end of the battery pack, are not required. Consequently, the number of parts necessary to manufacture the battery pack is greatly reduced, whereby it is possible to reduce manufacturing cost. In addition, the size of the battery cell is increased in proportion to the volume of the omitted parts, whereby it is possible to maximize the capacity of the battery cell.

In the present invention, the kind of the resin injected in the hot-melt process is not particularly restricted. Preferably, the resin used in the present invention has physical properties such that it is capable of stably fixing the PCB to the battery cell while reducing cost, compared to the conventional hot-melt type battery pack. Specifically, the hot-melt resin may be at least one selected from a group consisting of polyamide resins.

Polyamide resins are able to withstand a temperature range of −40 to 125° C. Consequently, polyamide resins exhibit excellent heat resistance and cold resistance. In addition, the hardening time of the polyamide resins is short, whereby the polyamide resins may be injected. Furthermore, the process time may also be reduced through low-temperature, low-pressure injection, whereby the polyamide resins may be mass-produced. Consequently, the polyamide resins may be more preferably used.

In addition, the hot-melt process may be performed at a temperature of 180 to 200° C.

In the case in which the hot-melt process is performed at a temperature of less than 180° C., the strength of the peripheral edge formed through the hot-melt process may not reach a desired level. On the other hand, in the case in which the hot-melt process is performed at a temperature of greater than 200° C., excessive heat is applied to the battery cell, with the result that the battery cell may be damaged.

Furthermore, the hot-melt process may be performed at a pressure of 1 bar to 3 bar.

In the case in which the hot-melt process is performed at a pressure of less than 1 bar, it is difficult to distribute the hot-melt resin in the mold to a desired distance. On the other hand, in the case in which the hot-melt process is performed at a pressure of greater than 3 bar, excessive pressure is applied to the battery cell, with the result that the battery cell may be damaged.

Meanwhile, the battery pack may be an embedded type battery pack, which is embedded in the device. That is, since the battery pack is embedded in the device, the product may be completed only by surrounding the outer edge of the battery cell through the hot-melt process, as described above. Consequently, a step of wrapping the outer surface of the battery cell with a label may be omitted, whereby a cost reduction may be achieved.

Of course, the method may further include (g) wrapping outer surfaces of the PCB and the battery cell with a label after step (f) as needed.

In addition, the connector, which is configured to connect the battery pack to the device, is not particularly restricted as long as the connector enables electrical and mechanical connection between the device and the battery pack. For example, the connector may be a flexible printed circuit board (FPCB).

In a concrete example, the battery cell may have a structure in which the outer edge of an electrode assembly is sealed in the state in which the electrode assembly is mounted in a battery case made of a laminate sheet including a resin layer and a metal layer. In terms of the shape of the battery cell, the battery cell may be configured to have a plate-shaped rectangular structure.

In accordance with another aspect of the present invention, there is provided a battery pack manufactured using the method described above.

The battery pack may have a battery cell, including a peripheral edge formed by a hot-melt process, embedded therein.

As described above, the battery pack according to the present invention includes a peripheral edge formed through the hot-melt process, instead of various members, such as a PCM case necessary to load the PCB on the battery cell, a lower case for sealing the lower end of the battery pack, and frames provided at opposite sides of the battery cell, which are included in a conventional battery pack. Consequently, the number of parts necessary to manufacture the battery pack is greatly reduced, whereby it is possible to reduce manufacturing cost. In addition, the size of the battery cell is increased in proportion to the volume of the omitted parts, whereby it is possible to maximize the capacity of the battery cell. Furthermore, the hot-melt fixing structure is used, whereby it is possible to improve the durability of the battery pack.

In a concrete example, the peripheral edge may have a thickness of 1 to 6 mm, specifically 1 to 3 mm, in order to maximize the above effects.

In the case in which the thickness of the peripheral edge is less than 1 mm, it is difficult to protect the battery cell from external impact and to fix the battery cell and the PCB. On the other hand, in the case in which the thickness of the peripheral edge is greater than 6 mm, the thickness of the battery cell is increased. As a result, the number of stacks may be increased, whereby an internal short circuit may occur. Consequently, a large thickness of the peripheral edge is not advantageous in terms of safety.

In addition, a portion of the peripheral edge formed at the upper end of the battery cell may be thicker than the remaining portion of the peripheral edge. Specifically, the portion of the peripheral edge formed at the upper end of the battery cell may have a thickness of 3 to 6 mm.

In the case in which the thickness of the upper peripheral edge is less than 3 mm, an overflow phenomenon, in which the hot-melt resin overflows at the upper peripheral edge, may occur. On the other hand, in the case in which the thickness of the upper peripheral edge is greater than 6 mm, the upper peripheral edge may not be filled with the hot-melt resin, whereby unmolded portions may be present in the battery pack.

In a concrete example, the battery pack may be configured to have a structure in which a connector protrudes outward such that the connector can be connected to the device. The upper case of the battery pack may be provided with an opening, through which the connector extends, such that the connector protrudes outward.

In accordance with a further aspect of the present invention, there is provided a device including the battery pack as a power source. Specific examples of the device may be a mobile phone, a portable computer, a smart phone, a smart pad, a tablet PC, and a netbook computer. However, the present invention is not limited thereto.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 2:
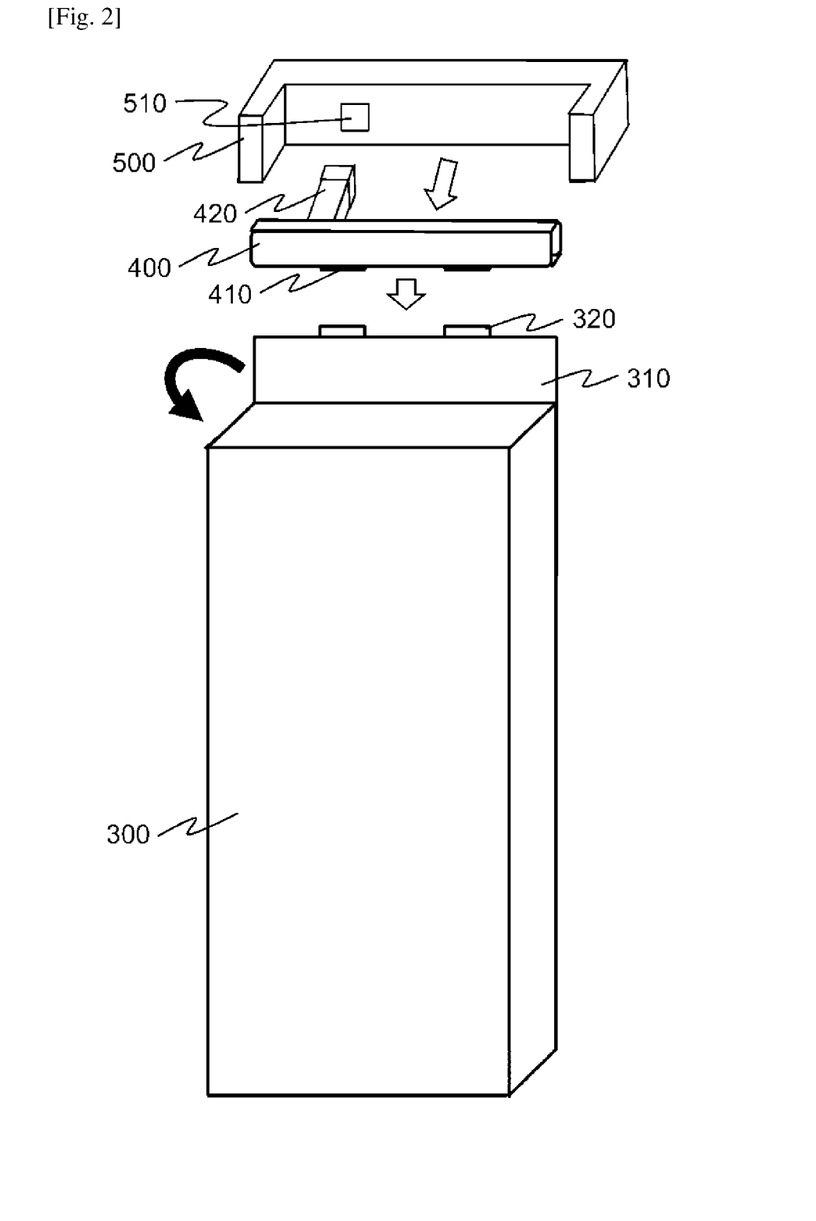
FIG. 2 is a schematic view showing a method of coupling an upper case, a battery cell, and a protection circuit board (PCB) according to an embodiment of the present invention.
Figure 3:
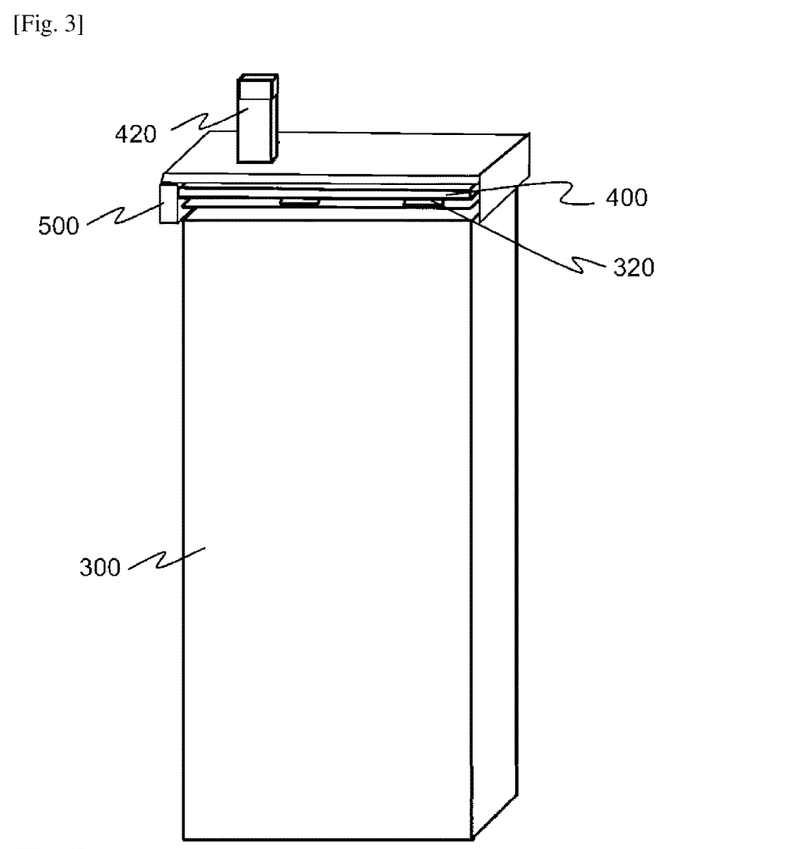
FIG. 3 is a schematic view showing the structure of the upper case, the battery cell, and the PCB that are coupled using the method of FIG. 2.
Figure 4:
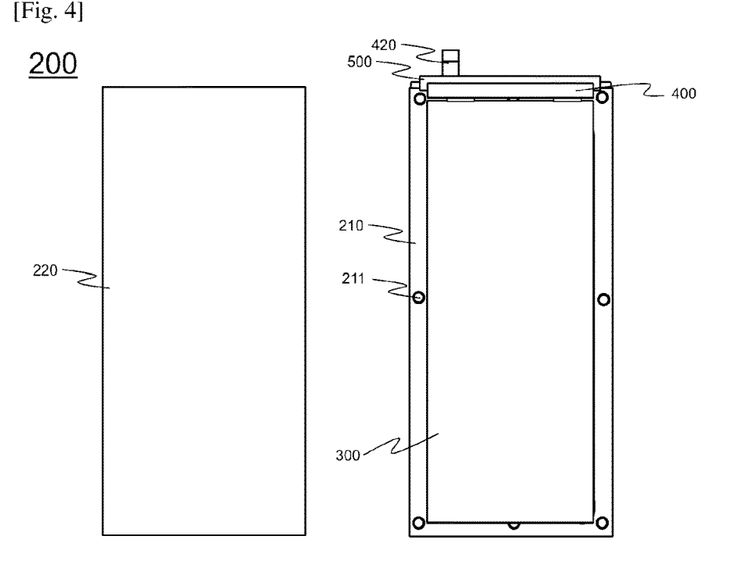
FIG. 4 is a sectional view schematically showing a mold according to an embodiment of the present invention, in which the resultant structure of FIG. 3 is disposed.
Figure 5:
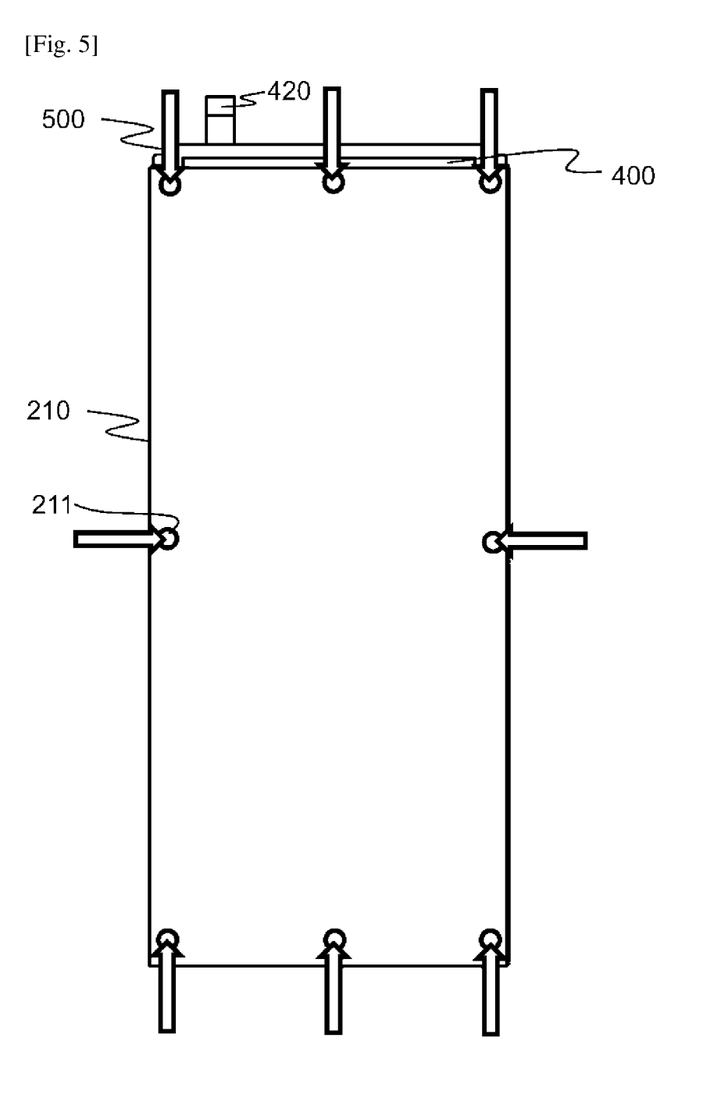
FIG. 5 is a sectional view schematically showing a process of injecting a hot-melt resin into the mold of FIG. 4.
Figure 6:
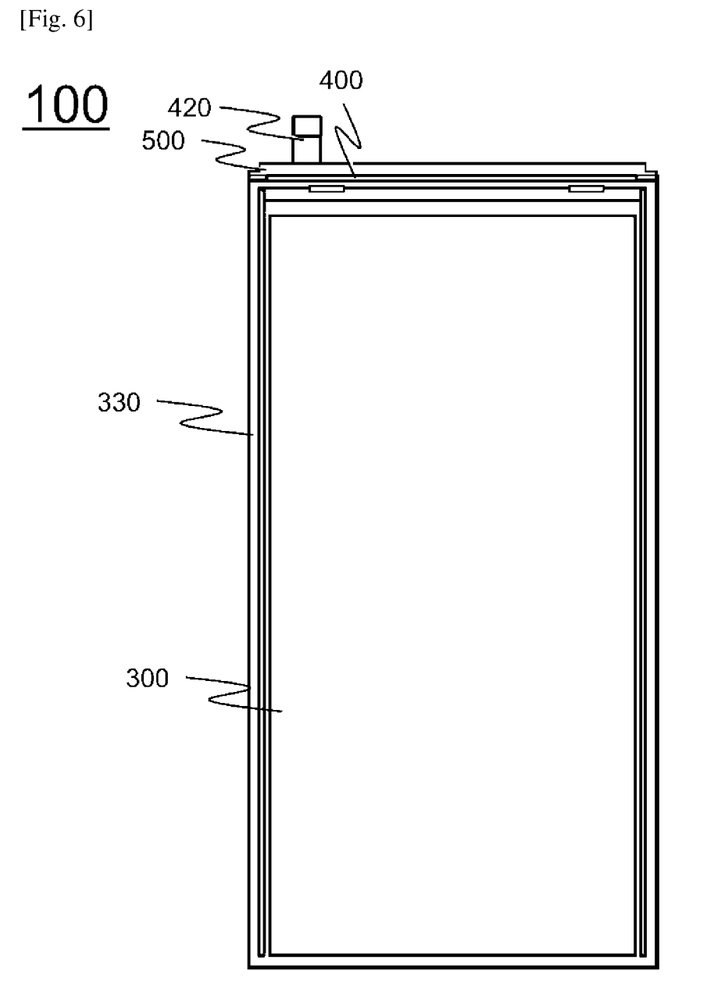
FIG. 6 is a sectional view schematically showing a battery pack removed from the mold after the hot-melt resin is injected as shown in FIG. 5.

FIG. 2 is a schematic view showing a method of coupling an upper case, a battery cell, and a protection circuit board (PCB) according to an embodiment of the present invention, FIG. 3 is a schematic view showing the structure of the upper case, the battery cell, and the PCB that are coupled using the method of FIG. 2, FIG. 4 is a sectional view schematically showing a mold according to an embodiment of the present invention, in which the resultant structure of FIG. 3 is disposed, FIG. 5 is a sectional view schematically showing a process of injecting a hot-melt resin into the mold of FIG. 4, and FIG. 6 is a sectional view schematically showing a battery pack removed from the mold after the hot-melt resin is injected as shown in FIG. 5.

A method of manufacturing a battery pack 100 according to the present invention will be described with reference to FIGS. 2 to 6.

Referring first to FIGS. 2 and 3, electrode terminals 320 of a battery cell 300 are electrically connected to electrode terminal connection portions 410 of a PCB 400 having a protection circuit formed thereon, and then an upper case 500 is coupled to the upper part of the PCB 400. At this time, the upper case 500 is coupled to the upper part of the PCB 400 such that a connector 420 formed on the upper surface of the PCB 400 is exposed through an opening 510 formed in the upper case 500.

Subsequently, an upper sealed portion 310 of the battery cell 300, at which the electrode terminals 320 are located, is bent, and the PCB 400, to which the upper case 500 has been coupled, is loaded on the upper end of the battery cell 300 such that the PCB 400 is parallel to the outer wall of an electrode assembly receiving part of the battery cell.

As shown in FIG. 4, the upper case 500, the PCB 400, and the battery cell 300, which have been connected to each other, as described above, are placed in a mold provided in regions thereof corresponding to a peripheral edge 330 of the battery cell 300 (see FIG. 6) with two or more injection ports, through which a hot-melt resin is injected. The mold includes a lower mold 210 and an upper mold 220, which are coupled to each other such that a hot-melt process is performed. The injection ports 211 are formed in the lower mold 210. Although not shown, a structure corresponding to the external shapes of the upper case, the PCB, and the battery cell, which have been coupled to each other, is carved in at least one selected from between the lower mold 210 and the upper mold 220.

Subsequently, as shown in FIG. 5, a hot-melt resin is injected through the injection ports 211 to perform a hot-melt process, in which the hot-melt resin fills a space defined between the upper case 500, the PCB 400, and the battery cell 300 and the mold 210. The PCB 400 is fixed to the upper part of the battery cell 300 through the hot-melt process.

That is, in the method of manufacturing the battery pack 100 according to the present invention, the upper case 500, the PCB 400, and the battery cell 300, which are coupled to each other, are placed between the lower mold 210 and the upper mold 220, the lower mold 210 and the upper mold 220 are coupled to each other, and a hot-melt resin is injected through the injection ports 211 formed in the lower mold 210 to form a peripheral edge at the battery cell 300, whereby the battery pack 100 is manufactured.

In the battery pack 100 manufactured as described above, various members, such as a PCM case necessary to load the PCB 400 on the battery cell 300, a frame necessary to mount the battery cell, and a lower case for sealing the lower end of the battery pack, are not required. Consequently, the number of parts required to manufacture the battery pack is greatly reduced, whereby it is possible to reduce manufacturing cost. In addition, the size of the battery cell is increased in proportion to the volume of the omitted parts, whereby it is possible to maximize the capacity of the battery cell.

In addition, the upper case 500, the PCB 400, and the battery cell 300 are coupled to each other only through a hot-melt process, whereby it is possible to improve manufacturing efficiency.

Although not show in the drawings, the method of manufacturing the battery pack according to the present invention may further include a step of wrapping the battery pack 100 with a label.

Meanwhile, the structure of the lower mold 210 will be described in more detail with reference to FIG. 7, which is a sectional view schematically showing the structure of the lower mold of FIG. 4.

Figure 7:
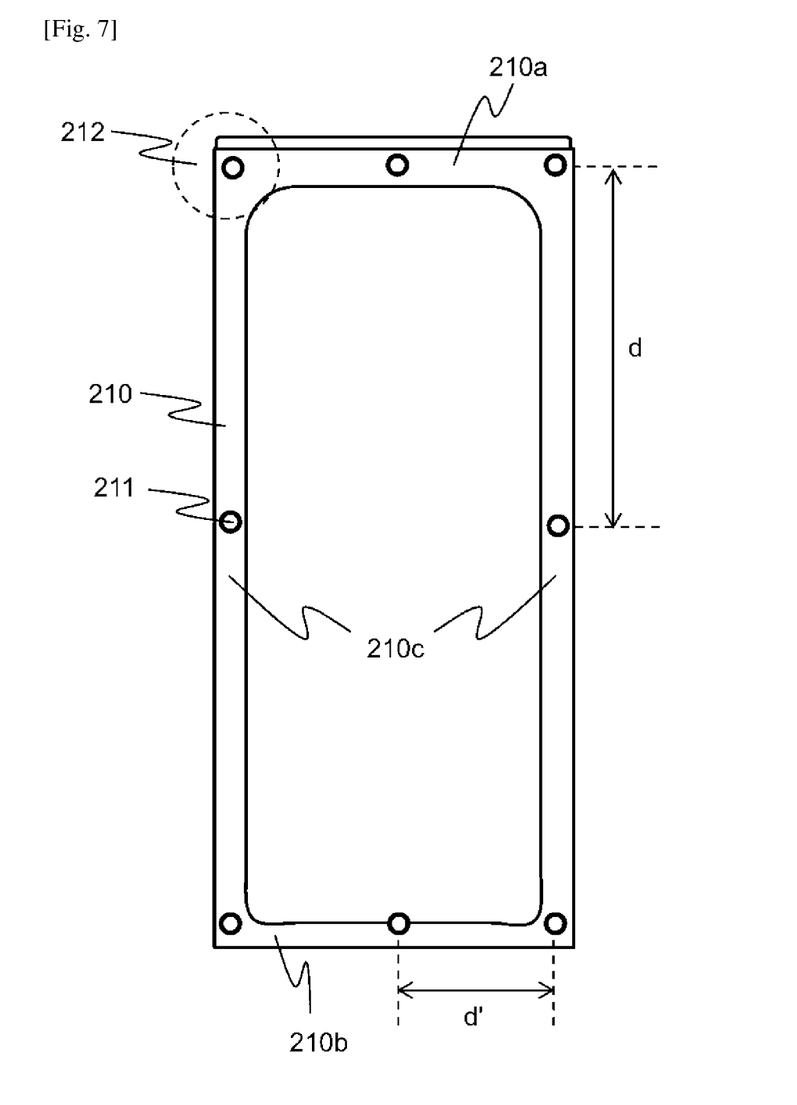
FIG. 7 is a sectional view schematically showing the structure of a lower mold of FIG. 4.

Specifically, referring to FIG. 7 together with FIG. 6, eight injection ports 211 are formed in the lower mold 210. Specifically, three injection ports 211 are formed in the upper part 210a of the lower mold 210, at which the electrode terminals are located, three injection ports 211 are formed in the lower part 210b of the lower mold 210, and one injection port 211 is formed in the middle of each side part 210c of the lower mold 210.

That is, the injection ports 211 are formed in all regions of the lower mold 210, whereby it is possible to thickly form a peripheral edge of the upper part of the battery cell, at which the PCB is located, in order to stably fix and mount the PCB to the battery cell without using a conventional PCM case, to seal the lower end of the battery cell 300 and form a peripheral edge 330, which is necessary to fix the battery cell 30, at the lower end of the battery cell 300 without using a lower case, and to form a peripheral edge 330, which is necessary to protect the battery cell 300 from external impact, at the side surface of the battery cell 300 without using conventional side frames, which are provided at the battery cell.

In addition, since the injection ports 211 are formed in all peripheral corners 212 of the lower mold, the hot-melt resin does not pass through bent parts of the mold when the hot-melt resin flows in the mold, whereby the mobility of the hot meld resin is improved.

The distances d and d' between the injection ports 211 may range from 10 mm to 15 mm.

In the case in which the distances d and d' between the injection ports 211 are less than 10 mm, the number of injection ports 211 formed in the lower mold 210 is excessively increased, whereby the manufacturing process is complicated and the manufacturing cost is increased. On the other hand, in the case in which the distances d and d' between the injection ports 211 are greater than 15 mm, the movement distance of the hot-melt resin is increased, whereby it is difficult to achieve the desired effects of the present invention.

In conclusion, in the method of manufacturing the battery pack 100 according to the present invention, the distances between the injection ports 211 are reduced, and the injection ports 211 are effectively disposed along the lower mold 210, whereby it is possible to increase the mobility of the hot-melt resin and to form the peripheral edge 330 at a low pressure, compared to the conventional art.

As described above, in the method of manufacturing the battery pack according to the present invention, the upper case, the PCB, and the battery cell are simultaneously coupled to each other through the hot-melt process without using additional members, such as double-sided adhesive tape and a PCM case, whereby it is possible to improve manufacturing efficiency and reduce manufacturing cost due to the reduction in the number of parts. In addition, in the method of manufacturing the battery pack according to the present invention, two or more injection ports are formed in the mold in order to improve the mobility of the hot-melt resin in the mold, whereby it is possible to improve the efficiency with which the hot-melt resin is filled in the mold and to reduce the defect rate of molded products. Furthermore, the peripheral edge is formed at the battery cell at a low pressure, whereby it is possible to minimize the impact applied to the battery cell during the hot-melt process. Moreover, it is possible to improve the durability of the battery pack using the hot-melt fixing structure. Besides, side frames are not provided at the battery cell, whereby it is possible to increase the size of the battery cell in proportion thereto and thus to increase the capacity of the battery pack, compared to a conventional frame hot-melt type method of manufacturing the battery pack, in which both a frame and a hot-melt resin are used to mount the battery cell.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in a method of manufacturing a battery pack according to the present invention, an upper case, a PCB, and a battery cell are simultaneously coupled to each other through a hot-melt process without using additional members, such as double-sided adhesive tape and a PCM case. In particular, a label can be removed from an embedded type battery pack. Consequently, it is possible to improve manufacturing efficiency and reduce manufacturing cost due to the reduction in the number of parts. In addition, in the method of manufacturing the battery pack according to the present invention, two or more injection ports are formed in a mold in order to improve the mobility of a hot-melt resin in the mold, whereby it is possible to improve the efficiency with which the hot-melt resin is filled in the mold and to reduce the defect rate of molded products. Furthermore, the peripheral edge is formed at the battery cell at a low pressure, whereby it is possible to minimize the impact applied to the battery cell during the hot-melt process. Moreover, it is possible to improve the durability of the battery pack using the hot-melt fixing structure. Besides, side frames are not provided at the battery cell, whereby it is possible to increase the size of the battery cell in proportion thereto and thus to increase the capacity of the battery pack, compared to a conventional frame hot-melt type method of manufacturing the battery pack, in which both a frame and a hot-melt resin are used to mount the battery cell.

The invention claimed is:

1. A method of manufacturing a battery pack comprising a battery cell having an electrode assembly received in a battery case, made of a laminate sheet comprising a resin layer and a metal layer, together with an electrolytic solution, the method comprising:
   (a) electrically connecting electrode terminals of the battery cell to electrode terminal connection parts of a protection circuit board (PCB) having a connector, which is configured to be electrically connected to a device that uses the battery pack, and a protection circuit formed thereon;
   (b) coupling an upper case to an upper part of the PCB;
   (c) bending an upper sealed portion of the battery cell, at which the electrode terminals are located, and loading the PCB, to which the upper case has been coupled, on an upper end of the battery cell such that the PCB is parallel to an outer wall of an electrode assembly receiving part of the battery cell and such that the connector protrudes upward, and thereby form a resultant structure including the upper case, the PCB, and the battery cell;
   (d) placing the upper case, the PCB, and the battery cell, which have been coupled to each other as the resultant structure, in a mold, which is provided in regions thereof corresponding to a peripheral edge of the battery cell with two or more injection ports, through which a hot-melt resin is injected;
   (e) injecting the hot-melt resin through the injection ports to perform a hot-melt process, in which the hot-melt resin fills a space defined between the upper case, the PCB, and the battery cell and the mold to form a peripheral edge of the battery cell; and
   (f) removing the battery pack being a combination of the resultant structure and the peripheral edge from the mold,
   wherein step (e) comprises fixing the PCB to the upper part of the battery cell through the hot-melt process,
   wherein two or more injection ports are formed in an upper part of the mold, at which the electrode terminals are located,
   wherein two or more injection ports are formed in a lower part of the mold,
   wherein one injection port is formed in a middle of each side part of the mold,
   wherein the hot-melt resin is injected simultaneously into at least the two or more injection ports in the upper part of the mold and the two or more injection ports in the lower part of the mold to from a single piece of resin joining the PCB to the upper part of the battery cell without an interface between the hot-melt resin injected into the upper part of the mold and the lower part of the mold, wherein the hot-melt process is performed at a temperature of 180 to 200° C., and wherein the hot-melt process is performed at a pressure of 1 bar to 2 bar.

2. The method according to claim 1, further comprising (g) wrapping outer surfaces of the PCB and the battery cell with a label after step (f), wherein steps (a) to (f) are performed in listed order.

3. The method according to claim 1, wherein the battery cell is configured to have a plate-shaped rectangular structure.

4. The method according to claim 1, wherein the battery pack is an embedded type battery pack, which is embedded in the device.

5. The method according to claim 1, wherein the connector is a flexible printed circuit board (FPCB).

6. The method according to claim 1, wherein the mold comprises a lower mold and an upper mold, which are coupled to each other such that the hot-melt process is performed, and wherein a structure corresponding to external shapes of the upper case, the PCB, and the battery cell, which have been coupled to each other, is carved in at least one selected from between the lower mold and the upper mold.

7. The method according to claim 6, wherein the injection ports are formed in the lower mold.

8. The method according to claim 1, wherein the mold has eight or more injection ports.

9. The method according to claim 1, wherein the injection ports are formed in all regions of the mold.

10. The method according to claim 1, wherein at least one of the injection ports is formed in peripheral corners of the mold.

11. The method according to claim 10, wherein the injection ports are formed in all peripheral corners of the mold.

12. The method according to claim 1, wherein a distance between the injection ports ranges from 10 mm to 15 mm.

13. The method according to claim 1, wherein the hot-melt resin is at least one selected from a group consisting of polyamide resins.

* * * * *